UNITED STATES PATENT OFFICE.

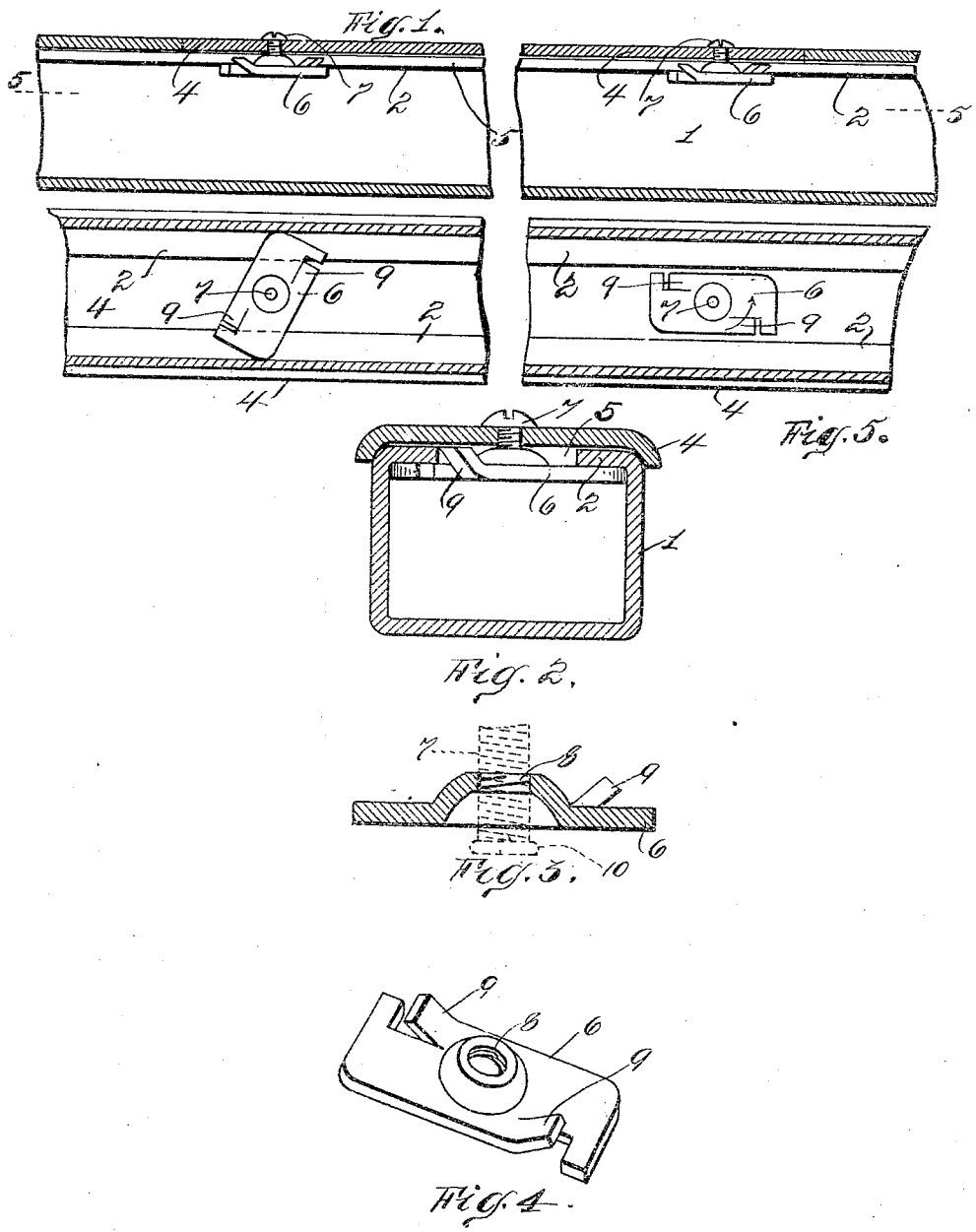

HUBERT KRANTZ, OF NEW YORK, N. Y.

CONDUIT-COVER.

No. 890,285.

Specification of Letters Patent.

Patented June 9, 1908.

Application filed October 18, 1907. Serial No. 398,037.

*To all whom it may concern:*

Be it known that I, HUBERT KRANTZ, a citizen of the United States, residing at the borough of Brooklyn, city and State of New York, have invented certain new and useful Improvements in Conduit-Covers, of which the following is a clear, full, and exact description.

This invention relates to covered electrical conduits of the type shown in my United States Patent No. 753,714 issued March 1, 1904.

The object of the invention is to provide a clamping means carried by the cover, adapted to engage the ledges of the conduit which will make the fitting and clamping of the cover to the conduit a simple operation.

A further object is to so adapt the clamping means that the cover can be readily removed, the clamping means being readily thrown out of register with the conduit ledges.

All these advantages are obtained preferably by a slight rotation of a screw by which the clamping means is carried upon the cover.

The scope of my invention will be pointed out in the claims.

In the accompanying drawings Figure 1 is a central sectional side elevation of a conduit and cover made according to this invention. Fig. 2 is a section on line 5—5 Fig. 1 showing the cover in clamped position. Fig. 3 is a section of the clamping bar of Fig. 4. Fig. 4 is a perspective view of the clamping bar and Fig. 5 is a sectional plan looking up on line 5—5 Fig. 1 showing one clamp in clamping position and one in position for removal of the cover.

As shown in the drawings and as shown in my before mentioned United States patent, the conduit 1 is provided with turned over ledges 2 leaving an open face 5 between them throughout the length of the conduit. A cover 4, when in place serves to cover the open face 5.

According to this invention I carry on the under side of the cover 4, at all times one or more clamping bars 6, supported on screws 7, which screw into the bars 6.

The bars 6 are provided with a central threaded opening 8 for engagement with the screw 7. The ends of the bars 6 which contact with the interior walls of the conduit are preferably curved and as shown in Fig. 5 are preferably longer than the interior width of the conduit so that a bar in clamping position will lie across the open face at an angle. Stop lugs 9 bent toward the cover's under surface protrude into the open face and limit the turning of the bar 6 on its screw in at least one direction of rotation of the same.

After attachment of the bars to the cover, the ends of the screws 7 may be enlarged as shown in dotted lines at 10 Fig. 3, but ordinarily, galvanizing of the bar and screw will prevent its too ready removal.

In placing a cover 4 in position all the clamping bars or plates will be first arranged longitudinally of the cover in the position shown at the right of Fig. 5, and the cover then inserted into place to close the aperture. The installer may then take a screw-driver and turn the screw 7 of each clamping bar from the outside in the direction of the arrow, Fig. 5, to cause the clamping bar to be thrown across the ledges 2 as shown at the left of Fig. 5. Inasmuch as the clamping bar is of greater length than the width of the conduit, the bar will be obliged to lie obliquely across and turn but a partial revolution, then being stopped by the sides of the conduit itself, as will be obvious. A further tightening of the screws 7 will not rotate the clamping bar any farther, but will tightly draw the same down upon the ledges and firmly clamp the cover in place. To remove the cover the screws 7 are turned contrary to the arrow in Fig. 5, which will first loosen the grip of the clamps, and after which, continued rotation will throw the clamping bars substantially into position at the right of Fig. 5 or at least cause the projecting lugs 9 to abut against the edges of the open ledges, so that the clamping bars will no longer prevent the removal of the cover.

I claim as my invention

1. A conduit having an open face with adjacent turned over ledges and a cover for the open face, a clamping bar carried by said cover, and means operable from without the conduit for placing said bar across the ledges within the conduit and registering means on said bar adapted to permit the movement of the bar to be definitely limited therein upon the unclamping of the same.

2. A conduit having an open face, ledges adjacent thereto and a cover therefor in combination with a clamping bar lying within the conduit, and a screw engaging the same and passing through the cover, said clamping bar being of greater length than the interior width of the conduit.

3. A conduit having an open face, ledges adjacent thereto, and a cover therefor in combination with a clamping bar lying within the conduit, a screw engaging the same and passing through the cover, and registering lugs on said bar adapted to engage the edges of the conduit ledges, said bar being adapted to be oscillated on its screw as a pivot, whereby, on tightening said screw, the bar may be rotated to cause it to lie transverse to the open face of the conduit.

4. A conduit having an open face, ledges adjacent thereto, and a cover therefor in combination with a clamping bar lying within the conduit, a screw engaging the same and passing through the cover, and registering lugs on said bar adapted to engage the edges of the conduit ledges, said bar being adapted to be oscillated on its screw as a pivot, whereby, on tightening said screw, the bar may be rotated to cause it to lie transverse to the open face of the conduit, said clamping bar being longer than the interior width of the conduit.

Signed at Brooklyn, New York this 16th day of October 1907.

HUBERT KRANTZ.

Witnesses:
   GEO. W. ECKERSON,
   J. A. NEWTON.